Patented Sept. 9, 1952

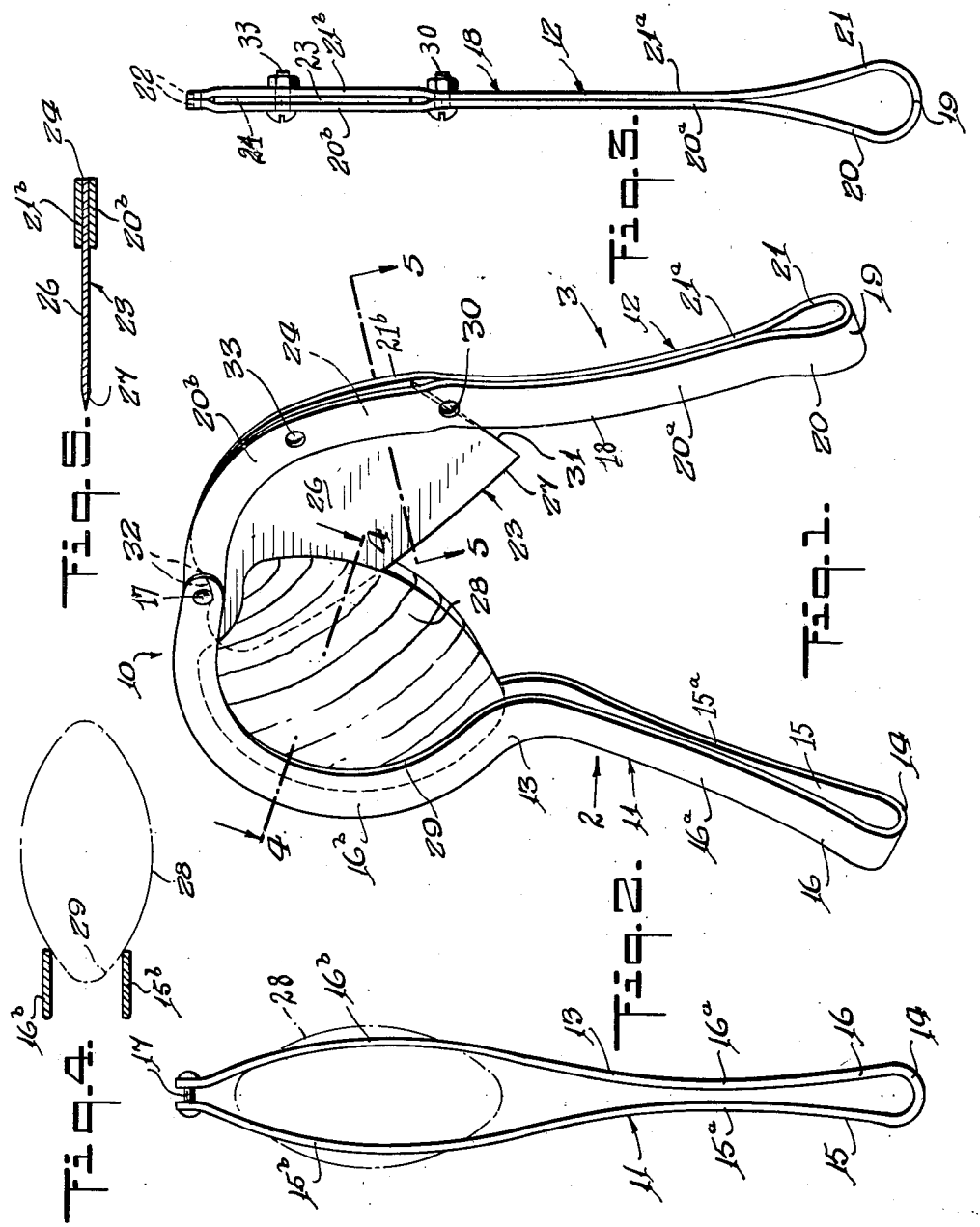

2,609,565

UNITED STATES PATENT OFFICE 2,609,565

DEVICE FOR SPLITTING CLAMS

Witold Mostowicz, New York, N. Y.

Application November 17, 1950, Serial No. 196,117

6 Claims. (Cl. 17—10)

This invention relates to devices for splitting clams, and has for its main object to provide a device of this character of novel improved construction.

Today the opening of clams is a rather slow, cumbersome and difficult operation, and my object is to provide a device whereby the opening or splitting of clams may be done in a more efficient, quicker and easier manner than has been the case heretofore.

Another object of this invention is to provide a device as characterized hereinbefore, which will be simple in construction, inexpensive, and adapted to mass manufacturing.

Still further objects of my invention will be apparent as the specification of the same proceeds, or will be pointed out therein, and, among others, I may mention: to provide a device of the type indicated which, with all the advantages mentioned, still will be safe in use and reliable and durable in operation.

In the drawings forming a part of this specification and accompanying the same:

Fig. 1 is a perspective view of my device in an open position, also showing a clam placed into it to be split or opened;

Fig. 2 is a side view of a left side member of the device of Fig. 1, the view taken as shown by the arrow 2, the clam to be split being indicated in a conventional manner and in dotted lines;

Fig. 3 is a side view of the right side member of the device of Fig. 1, as indicated by the arrow 3;

Figs. 4 and 5 are semi-diagrammatic sectional views on the lines 4—4 and 5—5 of Fig. 1, respectively.

Referring now to the drawings more in detail by characters of reference, the numeral 10 indicates my device, in general, being composed of two members, indicated in general by the numerals 11 and 12.

In the preferred embodiment of my invention, as shown in the drawings, each member 11 and 12 is formed of a strip of appropriate material folded doubled.

Referring to the member 11, it is formed of a strip of material 13 which preferably is steel or any other appropriate medium having a slight resiliency and great strength and resisting power. The strip 13 is folded doubled, its fold being indicated by the numeral 14, and the two legs or branches formed by the folds being indicated by the numeral 15, for the lower branch in Fig. 1, and 16 for the upper branch or leg.

As best shown in Fig. 2 the fold or bend 14 is comparatively large and rounded, whereupon the two legs 15 and 16 are caused to approach each other, the middle portions 15a and 16a thereof being substantially closely adjacent to one another.

Proceeding further to the upper end of the member 11, the two legs or branches again separate and form the upper portions 15b and 16b spaced apart in a larger manner than in the lower section of the device and somewhat bulging outwardly.

Finally, a pin 17 is secured across the upper ends of the two branches 15 and 16.

The other main element 12 of my device is also formed of a strip of material, generally indicated by the numeral 18, as best shown in Fig. 3, and the same is also folded doubled by a comparatively large rounded bend or fold 19 forming the two legs or branches 20 and 21.

In the middle lower part of the device, the portions 20a and 21a of the branches or legs are closely set on one another. In the upper or end portions 20b and 21b they are spaced apart in a predetermined manner so that a knife used in my device may be secured between them, as will be more fully explained hereinafter.

Finally, appropriate apertures or holes 22 are provided adjacent to the free ends of the legs 20 and 21 and in the assembled device as shown in Fig. 1, the member 12 will be pivoted through said apertures 22 on the pin 17 between the two legs or branches 15 and 16 of the other element 11 of my device.

The blade of my device is indicated at 23 and its inner portion, generally indicated by the numeral 24, is set between the two branches 20b and 21b of the male element 12 of my device and secured therein, as will be described. The major portion 26 of the blade is shaped as indicated in Fig. 1 and projects from the male element 12 and has a cutting edge 27 so shaped and proportioned, that when the two elements 11 and 12 are closed upon one another, the blade edge 27 will gradually split open the clam indicated at 28.

In the use of my device, the same is opened up as indicated in Fig. 1, the clam 28 placed into the female element 11 of my device resting by its rear narrower portion 29 between the spaced apart portions 15b and 16b of said female element, then the two elements are pivotally closed upon one another. In this closing, the clam 28 will be pressed into and against the branches 15b and 16b of the female element 11 but after a certain travel its width will prevent any further entrance of it thereinto, it will be wedged therein and said element 11 will be made of sufficiently strong, rigid, however slightly resilient, material adapted to stop any further spreading thereof and further entering of the clam 28.

The clam so being stopped and the necessary reaction provided, the blade 26 will enter it and initially separate the shell halves whereupon the device may be opened, the partly split clam removed and fully separated and finished by a knife, as usual.

The upper branches 20b and 21b of the male member are spaced apart sufficiently to permit the rear portion of the blade 24 to be slipped therebetween. A screw 30 is arranged at the lower end of the spaced apart portions passing through the two legs or branches, and the lower edge 31 of the blade 24 will be pressed against said screw when the device is operating.

The upper edge of the blade has an inward recessed portion 32, and when the device is operating, the blade may be pressed against the pivot pin 17, and in this manner the blade is secured during the operation and adapted to split the clam.

A tightening of the screw 30 will increase the frictional securing of the blade between the mentioned two legs or branches of the element 12. In operation the blade may crack or break since the clam usually offers very strong resistance against opening, and through my device a damaged blade 24 may be easily replaced by a new one.

When the blade is to be exchanged, the screw 30 may be somewhat loosened, the old blade removed, a new one slipped in, and then the screw 30 again tightened.

I also may employ a second removable screw, if I desire, indicated at 33, whereby the blade 24 may be additionally secured between legs 20b and 21b.

While I have shown a preferred embodiment of my invention, it is to be understood that changes and variations may be resorted to in the elements, construction and combination of my invention, and I reserve my rights to such changes and variations, as are within the spirit of this specification, and the scope of the claims hereunto appended. One such change may consist in replacing the pivot pin 17 by a screw to secure the respective ends of the longitudinal members to one another and to serve as their pivot.

Having thus described one form of my invention, I claim as new and desire to protect by Letters Patent of the United States:

1. In a device for splitting clams, said device having two elongated members pivoted to one another at one end thereof, the combination of each member being made of two strips of strong resisting but somewhat resilient material placed one over the other in substantially registering relation, the two strips in each member being spaced apart for a predetermined distance adjacent to the pivoted ends thereof, then continued closed on one another to form handles for the device, the strips in one, the first, member being spaced apart at said portion thereof at a larger distance adapted to receive a part of a clam between them, the strips of the other, the second, member being spaced apart to a lesser degree adapted to receive a flat blade knife between them, said blade projecting therefrom towards said first member and having a wide knife edge of predetermined curvature at its projecting end, said blade being secured between said strips by frictional action, and pins in said second member against which said blade is pressed when the device is used for opening a clam.

2. In a device, as set forth in claim 1, the two strips in each of said members being legs of one single strip doubled upon itself, closed at the lower end and open at the top for receiving a pivot member.

3. In a device, as set forth in claim 2, a screw through the second member at the lower end of the spaced apart portion thereof, whereby the closing of said portion on the blade may be adjusted.

4. In a device, as set forth in claim 3, a pivot pin for the device, said blade having recesses for said pivot pin and for said adjusting screw, respectively, whereby the blade may be pressed against them when in operation.

5. In a device for splitting clams, said device having two elongated members pivoted to one another at one end thereof, a clam receiving opening being provided in one member adjacent to said pivot, said opening being longer than its width and adapted to receive a clam substantially in the center line of said member, a narrow long opening being provided in the other member substantially in registering relation with the opening in said first member, and a wide blade placed into said narrow opening, said blade having a wide projecting knife edge, whereby upon closing the two members on one another said knife will be adapted to gradually split open a clam placed in said first member.

6. In a device, as set forth in claim 5, said blade being frictionally engaged in said narrow opening, and pins across said opening, said blade being adapted to be pressed against said pins when the clam is being split by it.

WITOLD MOSTOWICZ.

REFERENCES CITED

The following references are of record in the file of this patent:

UNITED STATES PATENTS

| Number | Name | Date |
|---|---|---|
| 708,014 | Blagden | Sept. 2, 1902 |
| 2,473,608 | Plock | June 21, 1949 |

FOREIGN PATENTS

| Number | Country | Date |
|---|---|---|
| 12,651 | Great Britain | June 7, 1849 |
| 3,358 | Great Britain | Feb. 16, 1894 |
| 778,996 | France | Jan. 5, 1935 |